US005614054A

United States Patent [19]

Reeves et al.

[11] Patent Number: 5,614,054

[45] Date of Patent: Mar. 25, 1997

[54] PROCESS FOR REMOVING A THERMAL BARRIER COATING

[75] Inventors: Jim D. Reeves, Cincinnati; Mark K. Whiteaker, West Carrollton; Peter C. Fry, Cincinnati, all of Ohio

[73] Assignee: General Electric Company, Cincinnati, Ohio

[21] Appl. No.: 362,377

[22] Filed: Dec. 22, 1994

[51] Int. Cl.[6] .......... B32B 35/00

[52] U.S. Cl. .......... 156/344; 29/402.06; 134/3; 134/7; 134/19; 134/21; 134/27

[58] Field of Search .......... 156/344, 646.1, 156/648.1, 656.1; 29/402.04, 402.06; 216/89; 252/79.3; 134/3, 7, 11, 19, 21, 27, 31, 37

[56] References Cited

U.S. PATENT DOCUMENTS

| | | | |
|---|---|---|---|
| 4,032,359 | 6/1977 | Fisher et al. | 134/3 |
| 4,098,450 | 7/1978 | Keller et al. | 228/119 |
| 4,528,047 | 7/1985 | Beyer et al. | 156/644.1 X |
| 4,605,479 | 8/1986 | Faith, Jr. | 204/192.17 |
| 4,889,589 | 12/1989 | McComas | 156/646 |
| 5,294,262 | 3/1994 | Nishimura | 134/31 X |

*Primary Examiner*—Mark A. Osele
*Attorney, Agent, or Firm*—Andrew C. Hess; Nathan D. Herkamp

[57] ABSTRACT

A process is provided for removing a thermal barrier coating that has been deposited on the surface of an article. Thermal barrier coatings that can be removed by the process of this invention are generally composed of a ceramic layer that is bonded to the surface of an article by a metallic bond layer. The process generally involves heating the article and its thermal barrier coating to a temperature of at least about 870° C., and exposing the thermal barrier coating to a halogen-containing agent for a duration sufficient to deteriorate the bond between the thermal barrier coating and the article to the extent that the coating separates from the article without damaging the underlying surface. The process can be carried out within various types of heated enclosures, including those within which the halogen-containing agent is introduced in a gaseous state, or those in which the halogen-containing agent can be prepared as a powder mixture that changes to a vapor when heated.

20 Claims, No Drawings

PROCESS FOR REMOVING A THERMAL BARRIER COATING

This invention generally relates to thermal barrier coatings for components exposed to high temperatures, such as the hostile thermal environment of a gas turbine engine. More particularly, this invention is directed to a process for removing a thermal barrier coating from such components and from the equipment used to coat them, wherein the process employs a halogen-containing agent that attacks the bond between the thermal barrier coating and its underlying substrate without damaging the substrate.

BACKGROUND OF THE INVENTION

Higher operating temperatures of gas turbine engines are continuously sought in order to increase the operating efficiency of such engines. As operating temperatures increase, the high temperature durability of the components of the engine must correspondingly increase, particularly the blades, vanes and shrouds of the high pressure turbine section. In addition to or as an alternative to increasing the high temperature capability of the material from which such components are formed, a common solution is to form a thermal insulating layer on the surfaces of the components in order to minimize their service temperatures.

For this purpose, thermal barrier coatings (TBC) formed directly on the component surface have found wide use. Such coatings generally entail the deposition of a metallic bond layer onto the surface of a component, followed by a ceramic layer which serves to thermally insulate the component. Preferably, the metallic bond layer is formed from an oxidation-resistant alloy, such as platinum aluminide, in order to promote the adhesion of the ceramic layer to the component, and thereby extend the life of the coating. Various ceramic materials have been employed as the ceramic layer, particularly zirconia ($ZrO_2$) stabilized by yttria ($Y_2O_3$), magnesia (MgO) stabilized by yttria, or other oxides. These materials can be readily deposited by physical vapor deposition (PVD) and air plasma spray techniques. These techniques require tooling to position, rotate and mask a component being coated, such that the coating process can be controlled to shield or coat selected portions of the component.

Because the equipment, tooling and maskants employed in the deposition process tend to become coated with the thermal barrier coating material, the coating material must be periodically removed from them in order to ensure their proper function and operation. For example, the removal of unwanted thermal barrier coating from a maskant is generally prudent when the thickness of the coating on the maskant is about 0.5 millimeter, which can develop in only a few coating cycles. The removal of coating from other tooling and equipment may be delayed until a coating thickness of about five to about eight millimeters is accumulated.

There is a corresponding need to repair the thermal barrier coatings of high temperature components of gas turbine engines in the event of spalling or unacceptable degradation of the coating. Repair methods generally entail completely removing the thermal barrier coating, restoring or repairing the surface of the component if necessary, and then recoating the component.

To be sufficiently resistant to impact damage and spalling, thermal barrier coatings preferably have a columnar structure that is very dense and hard. The columnar structure assists in relieving stresses created by the differential thermal expansions of the coating and the underlying substrate, and therefore reduces the tendency for spalling and the degree to which spalling will occur. Consequently, thermal barrier coatings are very difficult to remove while the component is in service and also during refurbishment of the component.

Prior art methods for removing thermal barrier coatings from engine components and coating equipment generally involve grit blasting the coating or subjecting the coating to an alkaline solution at high temperatures and pressures. However, grit blasting is a slow, labor-intensive process and erodes the surface beneath the coating. With repetitive use, the grit blasting process will eventually destroy the component or equipment. The use of an alkaline solution to remove a thermal barrier coating is also less than ideal, since the process requires the use of an autoclave operating at high temperatures and pressures.

Accordingly, it would be desirable to provide a method for removing a thermal barrier coating from components and coating equipment, in which the method does not damage the surface underlying the coating, does not require specialized and expensive equipment, and requires minimal labor to oversee the process and physically remove the coating.

SUMMARY OF THE INVENTION

It is an object of this invention to provide a process for removing a thermal barrier coating from an article.

It is a further object of this invention that such a process serve to deteriorate the bond between the thermal barrier coating and the article to the extent that the coating readily separates from the article without damaging the surface of the article.

It is another object of this invention that such a process be adaptable to removing a thermal barrier coating using various types of enclosure equipment.

The present invention generally provides a process for removing a thermal barrier coating that has been either intentionally or unintentionally deposited on an article. Thermal barrier coatings that can be removed by the process of this invention are generally composed of a ceramic layer, with or without a metallic bond layer. A bond layer will typically not be present on equipment, tooling and maskants used to deposit a thermal barrier coating on a high temperature component. However, a bond layer is a preferred constituent on the surfaces of high temperature components in order to tenaciously adhere the ceramic layer to the component, while the ceramic layer serves as a thermal insulator for the article.

The process generally involves heating the article and its thermal barrier coating to a temperature of at least about 870° C., and exposing the thermal barrier coating to a halogen-containing agent for a duration sufficient to deteriorate the bond between the thermal barrier coating and the article to the extent that the coating separates from the article without damaging the underlying surface. The process can be carried out within various types of heated enclosures, including those within which the halogen-containing agent is introduced in a gaseous state, or those in which the halogen-containing agent can be initially prepared as a powder that will be volatilized to form a reactant gas upon heating. With the latter technique, the article is packed in the powder such that the gaseous halogen-containing agent will become uniformly distributed over the surface of the thermal barrier coating.

In accordance with this invention, the process deteriorates the bond interface of the thermal barrier coating, rendering the coating a loose layer of fractured ceramic that can be removed with minimal effort. Notably, the ability to deteriorate the bond interface appears to improve with thermal barrier coatings having greater thicknesses, which is contrary to prior art methods for removing such coatings. Moreover, the process is relatively rapid, is not labor-intensive and, though tending to degrade aluminide bond layers, does not attack the metal surface of the article beneath the coating. Therefore, the process can be used repetitively without eventually destroying the component or equipment from which the coating is removed. Furthermore, the process can be conducted at atmospheric pressures, and therefore does not require an autoclave, as is required by the use of alkaline solutions of the prior art.

In view of the above advantages, the process of this invention is particular suitable for removing a thick thermal barrier coating from equipment, tools and maskants used to apply such coatings on gas turbine engine components, as well as thick thermal barrier coatings on such components.

Other objects and advantages of this invention will be better appreciated from the following detailed description.

DETAILED DESCRIPTION OF THE INVENTION

The present invention is generally directed to a novel process by which a thermal barrier coating can be readily removed from metal components and the equipment used to deposit such coatings. Notable examples of components on which thermal barrier coatings are employed include the blades, vanes and shrouds of gas turbine engines. A thermal barrier coating advantageously serves to reduce the service temperature of the component by functioning as an insulating layer on the component's surface. While the advantages of this invention are particularly apparent when the process is used on equipment employed to deposit thermal barrier coatings on components of gas turbine engines, the teachings of this invention are generally applicable to any situation in which a ceramic thermal barrier coating must be removed from the surface of a metallic article.

Thermal barrier coatings that can be removed by the process of this invention include those having a ceramic outer layer composed of yttria-stabilized zirconia, though it is foreseeable that the process works equally well with other types of ceramics and stabilized zirconia. Yttria-stabilized zirconia that is deposited to have a columnar microstructure is particularly resistant to spalling and delamination caused by high stresses imposed over large areas of a component. Accordingly, this type of ceramic is commonly used to form the thermal barrier coating for gas turbine engine components, and can be particularly difficult to remove by conventional methods.

Thermal barrier coatings that are applied to gas turbine engine components further include a metallic bond layer over which the ceramic layer is formed. The bond layer is preferably formed of an oxidation-resistant material, such that the bond layer will be resistant to oxidation and will therefore be capable of more tenaciously adhering the ceramic layer to the article. A preferred bond layer is formed by a nickel-base alloy, such as NiCrAlY, or an aluminide, such as platinum aluminide.

Thermal barrier coatings are often deposited with a physical vapor deposition or air plasma spray technique, though it is foreseeable that other deposition methods could be used.

A thermal barrier coating will often be deposited to a thickness of up to about one millimeter in order to provide the required thermal protection for the article, though it is foreseeable that greater thicknesses may be employed. In accordance with this invention, significantly thicker thermal barrier coatings can be readily removed without damaging the underlying surface of the article being refurbished.

Notably, during the deposition process, the coating material will inevitably become deposited on the equipment, tooling and maskants used in during deposition. Over several deposition cycles, these components will accumulate a coating whose thickness is well in excess of that formed on the components intended to be coated. According to this invention, the unwanted coatings can also be readily removed without damaging the underlying surface of the component being cleaned. The ability for the process of this invention to remove a thermal barrier coating without damaging the underlying substrate is particularly advantageous in this regard, since the equipment, tooling and maskants employed during the deposition process must be repeatedly freed of a thermal barrier coating in order to operate properly. Accordingly, the process of this invention serves to significantly increase the service life of such components.

The process of this invention generally involves heating the article to be refurbished to a temperature of at least about 870° C., and simultaneously exposing its thermal barrier coating to a halogen-containing agent. Preferred halogen-containing agents include hydrogen fluoride (HF), ammonium fluoride ($NH_4F$), ammonium chloride ($NH_4Cl$), hydrogen bromide (HBr) and hydrogen chloride (HCl). Fluoride-containing agents such as hydrogen fluoride and ammonium fluoride are particularly preferred, in that fluorine appears to be a more aggressive agent for this process. Exposure of the coating to these conditions is continued for a duration sufficient to deteriorate the bond between the thermal barrier coating and the article. On cooling, the thermal barrier coating will spontaneously separate from the article without damaging the surface of the article.

The process can be carried out using various types of heated enclosures, including those within which the halogen-containing agent can be introduced in a gaseous state, and those in which the halogen-containing agent can be used in a powdered form. With the former technique, the enclosure in which the process is conducted must be capable of being filled and purged of gases. One particularly suitable type of enclosure is the type of furnace facility in which the coating deposition process is performed. Advantageously, use of such a facility enables the simultaneous removal of a coating from a component intended to be refurbished, as well as the unwanted coating from the equipment, tooling and maskants employed in the coating process.

A preferred exposure temperature for the process is about 900° C. to about 1050° C. The halogen-containing agent is introduced into the enclosure in a gaseous state, and preferably constitutes about six to about thirteen volume percent of the treatment environment within the enclosure. A suitable duration for exposure is about three hours, though the duration can be altered significantly to adjust for the type of halogen-containing agent used, its concentration, and the process temperature. It is foreseeable that different exposure temperatures, durations and concentrations could be employed and achieve suitable results. After the treatment step, the enclosure is preferably purged of halogens compounds and other volatiles that may be present. A suitable method is to flow hydrogen or argon gas through the enclosure at an elevated temperature.

Verifications of the process of this invention were performed on various articles, including deposition tooling and maskants, each formed from a nickel or cobalt-base superalloy. The articles were coated with a ceramic layer of eight percent yttria-stabilized zirconia. The thicknesses of the ceramic layer was approximately 0.5 to about two millimeters on the maskants, and approximately eight millimeters on the tooling. The test articles were placed on racks within a production furnace facility of the type used to clean gas turbine engine components in preparation for brazing. The furnace was heated to a temperature of about 980° C., and thirteen volume percent hydrogen fluoride gas was introduced. These conditions were maintained for about three to four hours, after which the furnace was purged for about one hour with hydrogen gas at a temperature of about 1050° C.

After the purge operation, the test articles were cooled to room temperature and inspected. The interface bond between each article and its corresponding ceramic layer had been deteriorated to the point that the ceramic was reduced to fragmented pieces that either fell from the articles or became readily dislodged from the articles upon handling. Notably, the ability to deteriorate the interface bond appeared to improve with thermal barrier coatings having greater thicknesses, a result that was unexpected in view of prior art methods for removing such coatings. Importantly, the ceramic layer was not attacked by the hydrogen fluoride, but only the bond interface between the ceramic layer and its metal substrate. There was no damage to the surfaces of the articles, and the articles were each able to accept a new thermal barrier coating during a subsequent physical vapor deposition operation.

The second removal technique identified by this invention involves packing a coated article in an halogen-containing powder and heating the article and powder to a temperature of at least about 870° C. The powder can be a mixture composed of a halogen-containing powder, such as ammonium fluoride with a concentration up to about five weight percent and the balance being an inert oxide powder, such as aluminum oxide. The inclusion of an inert oxide powder serves to more uniformly distribute the halogen-containing agent over the surface of an article during the removal process. The thermal barrier coating is preferably surrounded and in intimate contact with the powder mixture. As before, the article and powder mixture are preferably heated to a temperature of about 900° C. to about 1050° C., and for a duration of about four to about six hours, though it is again foreseeable that different exposure temperatures and durations could be employed to achieve suitable results.

For this embodiment of the invention, the article and powder mixture can be enclosed in a sealed container, such as a furnace retort, which is placed in an atmospheric-controlled environment of a conventional furnace. After the treatment step, the furnace retort is preferably purged of volatiles by flowing hydrogen or argon gas at temperatures of about 900° C. to about 1050° C. through the retort, and then cooled to room temperature.

In accordance with this invention, each of the described processes serves to deteriorate the bond interface of a thermal barrier coating, rendering the coating a loose layer of fractured ceramic than can be removed with minimal effort. The mechanism by which the bond deteriorates is not well understood. Metallographic examination of coating fragments removed by the process of this invention has indicated that the ceramic layer is not attacked to any significant degree. Accordingly, it is theorized that halogen ions diffuse through the porous ceramic layer and attack the metal oxide bond. Subsequently, thermal strains created within the coating during cooling cause fracturing between the ceramic layer and the substrate.

The above theory is supported to some extent by several observations. First, the geometry of the article does not appear to effect the ease with which the coating is removed. Secondly, the thickness of the coating has a notable effect on the coatings' ability to be removed. Specifically, coatings having a thickness of about one to about eight millimeters can be more easily and uniformly removed than coatings whose thicknesses are less than about one millimeter. This capability is completely contrary to prior art methods for removing such coatings.

From the above, it can be seen that a significant advantage of this invention is that a process is provided by which thermal barrier coatings can be readily removed from various types of equipment and components. Though the process will attack various types of metallic bond layers that are used to adhere a ceramic layer to the surface of an article, it does not attack or erode the article's surface, such that the process can be used repetitively without eventually destroying the equipment or component from which the coating is removed. This capability is particularly advantageous when the process is used on the equipment, tooling and maskants that are employed during the deposition process, and therefore must be repeatedly subjected to removal of a very thick thermal barrier coating in order to operate properly.

An additional advantage is that the process can be conducted at atmospheric pressures within a conventional atmosphere-controlled furnace. As a result, the process of this invention does not require the use of an autoclave, and offers a safer method for removing thermal barrier coatings than those which use an alkaline solution at high temperatures and pressures.

While our invention has been described in terms of a preferred embodiment, it is apparent that other forms could be adopted by one skilled in the art, such as by substituting other suitable materials for the ceramic and bond layers, by utilizing various methods of exposing the thermal barrier coating to a suitable halogen-containing agent, or by the degree to which the coating bond is degraded for purposes of removing the thermal barrier coating. Accordingly, the scope of our invention is to be limited only by the following claims.

What is claimed is:

1. A process for removing a thermal barrier coating from a substrate, the method comprising the steps of:

providing a substrate on which a thermal barrier coating is adherently formed; and heating the thermal barrier coating and substrate to a temperature of at least about 870° C. and exposing the thermal barrier coating to a halogen-containing powder for a duration sufficient to deteriorate the bond between the thermal barrier coating and the substrate to the extent that at least a portion of the thermal barrier coating separates from the substrate without damaging the substrate.

2. A process as recited in claim 1 wherein the substrate is defined by a component of a gas turbine engine, the thermal barrier coating being composed of a ceramic layer and a bond layer intermediate the ceramic layer and a surface of the substrate.

3. A process as recited in claim 1 wherein the substrate is defined by coating equipment for applying a thermal barrier coating onto a substrate, the thermal barrier coating consisting essentially of a ceramic layer.

4. A process as recited in claim 1 wherein the heating step is performed at a temperature of about 980° C. to about 1050° C.

5. A process as recited in claim 1 wherein the halogen-containing powder comprises ammonium fluoride powder.

6. A process as recited in claim 1 further comprising the step of exposing the thermal barrier coating to a purging atmosphere after exposing the thermal barrier coating to the halogen-containing powder.

7. A process as recited in claim 1 wherein the exposing step is conducted within a heated enclosure.

8. A process as recited in claim 1 wherein the exposing step is conducted within a heated enclosure and substrate having the thermal barrier coating is surrounded by the halogen-containing powder prior to the heating step.

9. A process as recited in claim 8 wherein the heated enclosure contains a powder mixture composed of the halogen-containing powder and an inert oxide powder.

10. A process for removing a thermal barrier coating from a substrate, the method comprising the steps of:

providing a substrate on which a thermal barrier coating is adherently formed;

heating the thermal barrier coating and substrate to a temperature of at least about 870° C. and exposing the thermal barrier coating to a halogen-containing powder for a duration sufficient to deteriorate the bond between the thermal barrier coating and the substrate; and cooling the thermal barrier coating and the substrate such that at least a portion of the thermal barrier coating spontaneously separates from the substrate without damaging the substrate.

11. A process as recited in claim 10 wherein the substrate is defined by a component of a gas turbine engine, the thermal barrier coating being composed of a ceramic layer and a bond layer intermediate the ceramic layer and a surface of the substrate.

12. A process as recited in claim 10 wherein the substrate is defined by coating equipment for applying a thermal barrier coating onto a substrate, the thermal barrier coating consisting essentially of a ceramic layer.

13. A process as recited in claim 10 wherein the ceramic layer is composed of an yttria-stabilized zirconia.

14. A process as recited in claim 10 wherein the halogen-containing powder is ammonium fluoride powder.

15. A process as recited in claim 10 wherein the exposing step is conducted within a heated enclosure.

16. A process as recited in claim 10 wherein the exposing step is conducted within a heated enclosure and the halogen-containing powder is admixed with an inert oxide powder to form a powder mixture, the substrate having the thermal barrier coating being surrounded by the powder mixture prior to the heating step.

17. A process as recited in claim 16 wherein the halogen-containing powder is at a concentration of up to about five weight percent in the powder mixture.

18. A process as recited in claim 10 further comprising the step of exposing the thermal barrier coating to a hydrogen-containing atmosphere after the heating and exposing steps and prior to the cooling step.

19. A process as recited in claim 18 wherein the hydrogen-containing atmosphere is at a temperature of about 900° C. to about 1050° C.

20. A process for removing a thermal barrier coating from a substrate, the method comprising the steps of:

providing a substrate on which a thermal barrier coating is adherently formed, the thermal barrier coating consisting essentially of a ceramic layer having a thickness of up to about eight millimeters;

packing the substrate having the thermal barrier coating in a powder mixture comprising an inert oxide powder admixed with up to about five weight percent of a fluorine-containing powder;

heating the powder mixture, the thermal barrier coating and the substrate to a temperature of about 980° C. to about 1050° C. for a duration sufficient to deteriorate the bond between the thermal barrier coating and the substrate; and cooling the thermal barrier coating and the substrate such that at least a portion of the thermal barrier coating spontaneously separates from the substrate without damaging the substrate.

* * * * *